US006983659B2

(12) United States Patent
Soechting et al.

(10) Patent No.: US 6,983,659 B2
(45) Date of Patent: Jan. 10, 2006

(54) TURBINE BLADE CREEP LIFE EVALUATING METHOD, TURBINE BLADE CREEP ELONGATION STRAIN MEASURING APPARATUS, AND TURBINE BLADE

(75) Inventors: Friedrich Soechting, Miami, FL (US); Charles Ellis, Miami, FL (US); Yasuoki Tomita, Takasago (JP); Yugo Tokunaga, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/635,494

(22) Filed: Aug. 7, 2003

(65) Prior Publication Data

US 2004/0139809 A1 Jul. 22, 2004

Related U.S. Application Data

(63) Continuation-in-part of application No. 10/347,923, filed on Jan. 22, 2003.

(51) Int. Cl.
*G01M 15/00* (2006.01)

(52) U.S. Cl. ...................................................... 73/802
(58) Field of Classification Search ................. 73/784, 73/787, 602, 774, 802; 33/702, 783, 787, 33/788–790, 806, 792, 800, 809
See application file for complete search history.

(56) References Cited

U.S. PATENT DOCUMENTS 1,532,297 A * 4/1925 Bausch et al. ................ 33/800
4,956,925 A * 9/1990 East ............................. 33/810
5,166,892 A * 11/1992 Inoue et al. ................. 702/101
5,238,366 A * 8/1993 Ferleger ........................ 416/61
5,287,631 A * 2/1994 Stade ........................... 33/823
6,568,254 B2 * 5/2003 Pross ........................... 73/116

FOREIGN PATENT DOCUMENTS

| JP | 11-248605 | 9/1999 |
| JP | 2000-249666 | 9/2000 |

OTHER PUBLICATIONS

Wang Yan-rong et al., "Experimental Evaluation of High Temperature Low Cycle Fatigue/Creep Life of Turbine Blade", Journal of Aerospace Power, vol. 17, No. 4, Oct. 2002 (with English Abstract).

Zhou Bal-zhuo et al., "Life Prediction Considering Creep and Stress Relaxation for Gas Turbine Engine Hot Section", Journal of Aerospace Power, vol. 18, No. 3, Jun. 2003 (with English Abstract).

(Continued)

*Primary Examiner*—Robert Raevis
(74) *Attorney, Agent, or Firm*—Oblon, Spivak, McClelland, Maier & Neustadt, P.C.

(57) ABSTRACT

In order to provide a turbine blade creep life evaluating method for quantitively evaluating the life of a turbine blade, the turbine blade is determined to be within its allowable life if the creep elongation strain in the longitudinal direction of the turbine blade is less than 0.5% of an initial length, and is determined to exceed its allowable life if the creep elongation strain is 0.5% or more than the initial length. A turbine blade creep elongation strain measuring apparatus 20 comprises a first fixed end 21, a second fixed end 22, and a dial gauge 24. A dimension in the longitudinal direction is stamped on the surface of a turbine blade.

19 Claims, 6 Drawing Sheets

OTHER PUBLICATIONS

Meng Chun-ling et al., "Study of Predict Methods about Creep Break Life of Turbine Blade", Journal of Beijing Technology and Business University (Natural Science Edition), vol. 20, Jun. 2002 (with English Abstract).

Li Wei et al., "Research on Experimental Technique for Fatigue-Creep Life of the Turbine Blade in Aeroengine", Journal of Aerospace Power, vol. 16, No. 4, Oct. 2001 (with English Abstract).

\* cited by examiner

TURBINE BLADE CREEP LIFE EVALUATING METHOD, TURBINE BLADE CREEP ELONGATION STRAIN MEASURING APPARATUS, AND TURBINE BLADE

BACKGROUND OF THE INVENTION

1. Field of the Invention

The present invention relates to a turbine blade fatigue life evaluating method, a turbine blade creep elongation strain measuring apparatus, and a turbine blade.

2. Description of Related Art

A gas turbine comprises a compressor, a combustor, and a turbine (not shown in the drawings). According to such a gas turbine, compressed air which is compressed in the compressor is supplied to the combustor, and the compressed air is mixed with a fuel which is supplied separately, and combusted. The combustion gas which is generated in the combustion is supplied to the turbine so as to generate a rotational driving force at the turbine.

In FIG. 6, an example of an internal structure of such a turbine is shown. As shown in FIG. 6, in the turbine, a plurality of turbine blades 1 which are disposed circularly on a rotor which is not shown in the drawing, and a plurality of turbine stationary blades 2 which are disposed on a stator around the rotor are disposed alternately in the rotational axis direction (horizontal direction in FIG. 6) of a rotor. Also, a combustion gas flow channel 3, through which a combustion gas passes is formed. By doing this, the combustion gas which is introduced into the combustion gas flow channel 3 from a combustor rotates the turbine blades 1 and applies a rotational force to the rotor. Such a rotational force rotates a power generator (not shown in the drawing) which is connected to the rotor so as to generate electric power.

However, in such a gas turbine, a method for quantitively evaluating and managing the creep life of the turbine blade 1 has not been established; therefore, there is a concern that the entire gas turbine may be damaged if a creep defect occurs unexpectedly.

SUMMARY OF THE INVENTION

The present invention was made in consideration of the above-mentioned situation. Objects of the present invention are to provide a turbine blade life evaluating method for evaluating the creep life of a turbine blade quantitatively, to provide a suitable turbine blade creep elongation strain measuring apparatus which is used in the above-mentioned turbine blade fatigue life evaluating method, and to provide a turbine blade to which is favorably applied to the above-mentioned turbine blade creep life evaluating method is approximately applied.

In order to solve the above-mentioned problem, the present invention employs the following structure.

That is, a first aspect of the present invention is characterized in that in a turbine blade creep life evaluating method, a turbine blade is determined to be within the creep life if the creep elongation strain in the longitudinal direction of the turbine blade is less than 0.5% of the initial length, and the turbine blade is determined have exceeded its life if the creep elongation strain in the longitudinal direction of the turbine blade is 0.5% or more than the initial length.

According to the first aspect of the present invention, in the turbine blade life evaluating method, by adopting creep elongation strain such as 0.5% which is sufficiently lower than 2% as a reference for evaluating the creep life, it is possible to rapidly determine the life of a turbine blade such that a creep defect will not occur in contrast to a conventional turbine blade in which a fracture occurs when the creep elongation strain exceeds 2% due to a sudden decrease in strength.

According to a second aspect of the present invention, a turbine blade creep elongation strain measuring apparatus is characterized in comprising a first fixed end which is attached to an end of a turbine blade, a second fixed end which is attached to the other end of the turbine blade, and a measuring device which measures an interval dimension between the first fixed end and the second fixed end and a variance of the interval dimension according to a predetermined reference dimension.

With the turbine blade creep elongation strain measuring apparatus according to the second aspect of the present invention, the length of the turbine blade in an initial state in which creep elongation strain does not occur is measured in advance under the condition that the first fixed end is attached to an end of the turbine blade and the second fixed end is attached to the other end of the turbine blade. Furthermore, also by measuring the length of the turbine blade after being operated for a predetermined period of time, and by obtaining the difference between the length of such the post-operation turbine blade and the length in the above-mentioned initial state, it is possible to obtain a value of post-operation creep elongation strain accurately.

The turbine blade creep elongation strain measuring apparatus according to the second aspect of the present invention is characterized in that the measuring apparatus is disposed at a connecting section which connects the first fixed end and the second fixed end such that the first fixed end and the second fixed end are forced to be closer and measures an elongation dimension of the connecting section so as to measure the creep elongation strain of the turbine blade.

With a turbine blade creep elongation strain measuring apparatus according to a third aspect of the present invention, by only attaching the first fixed end to one end of the turbine blade and attaching the second fixed end to the other end of the turbine blade, the connecting section automatically adjusts the interval between the first fixed end and the second fixed end so as to be the shortest distance.

A turbine blade according to a fourth aspect of the present invention is characterized in being provided in a gas turbine, and an initial dimension in the longitudinal direction before operation is stamped thereon.

With the turbine blade according to the fourth aspect of the present invention, the length of any one of a plurality of turbine blades in the longitudinal direction can be obtained without taking the time to refer to records such as blueprints or the like.

With the turbine blade life evaluating method according to the first aspect of the present invention, it is possible to evaluate the life of a turbine blade quantitatively. As a result, it is possible to prevent a problem in that a creep defect suddenly occurs in the turbine blade which causes a serious damage to the entire gas turbine.

With the turbine blade creep elongation strain measuring apparatus according to the second aspect of the present invention, it is possible to determine the creep elongation strain by measuring the elongation with respect to the length of the turbine blade before being operated by using the turbine blade creep elongation strain measuring apparatus. Therefore, it is possible to quantitively estimate how many hours remain until the end of the creep life based on the value of the creep elongation strain.

With the turbine blade creep elongation strain measuring apparatus according to the third aspect of the present invention, because the connecting section automatically adjusts an interval dimension between the first fixed end and the second fixed end so as to be a minimum, it is possible to prevent deviations in the measurement results due to measurements by different operators.

With the turbine blade according to the fourth aspect of the present invention, because it is possible to know the length of any desired turbine blade without taking the time to refer to records such as blueprints or the like, it is possible to significantly reduce the amount of time for measuring the creep elongation strain for the purpose of performing a life evaluation of a turbine blade. Additionally, it is possible to prevent, in advance, mistakes from happening due to an oversight such as misidentification of a product number in advance.

DETAILED DESCRIPTION OF THE INVENTION

Figure 1:
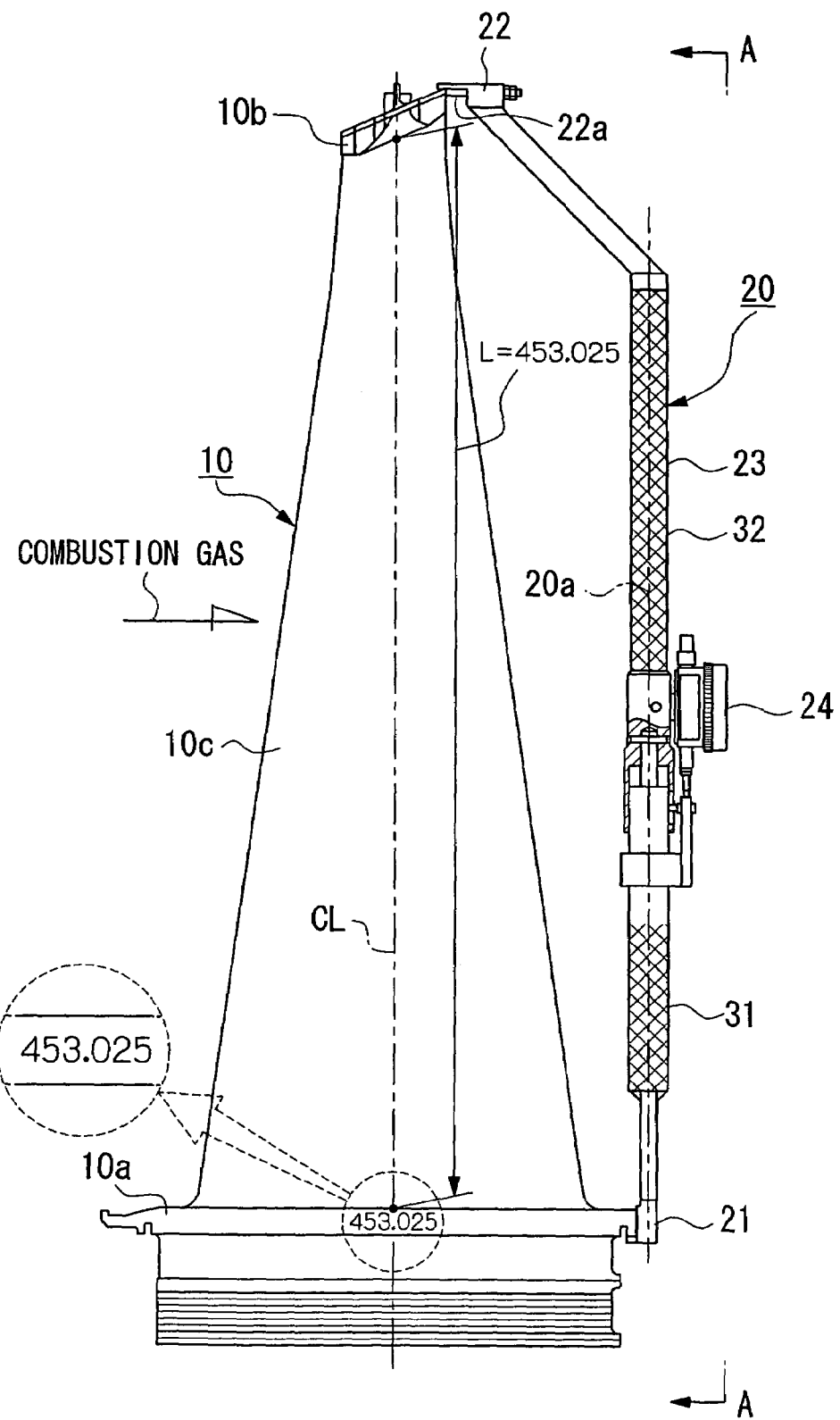
FIG. 1 is a front view of a turbine blade creep elongation strain measuring apparatus in an embodiment of the present invention.

An embodiment of a turbine blade creep life evaluating method using a turbine blade creep elongation strain measuring apparatus of the present invention, and a turbine blade which is evaluated by the above-mentioned method are explained with reference to the drawings as follows. Furthermore, the specific structural and functional details disclosed herein are merely representative and do not limit the scope of the invention.

A turbine blade of the present invention, which is not shown in the drawings, is a member which forms a part of a turbine in a gas turbine comprising a compressor, a combustor, and the turbine. That is, a rotor is supported axially so as to be rotatable in the turbine, and a plurality of turbine blades are fixed around the rotor. Also, the turbine introduces a combustion gas which is generated in the combustor into a combustion gas flow channel so as to expand. Furthermore, by rotating the rotor by blowing the combustion gas against each turbine blade, thermal energy of the combustion gas is converted into kinetic rotational energy to generate a driving force.

In FIG. 1, a turbine blade 10 according to the present embodiment is shown. The turbine blade 10 comprises an inner shroud 10a which is fixed on the rotor, an outer shroud 10b which forms the combustion gas flow channel in a space between the inner shroud 10a and the outer shroud 10b, and a blade section 10c which is formed between the inner shroud 10a and the outer shroud 10b. Reference symbol CL indicates a central axis line in the center in the width direction of the turbine blade 10.

As shown in FIG. 1, on a surface of the inner shroud 10a of the turbine blade 10, a length L in the longitudinal direction in an initial state before operation is stamped. The length L in the longitudinal direction is the dimension of a straight line between the outer surface of the inner shroud 10a at the position of the central axis line CL and the inner surface of the outer shroud 10b. The length L in the longitudinal direction is measured under the condition that the post-production creep elongation strain is 0 (zero) (for example, in FIG. 1, "453.025" indicating "L=453.025 mm" is stamped).

Figure 2:
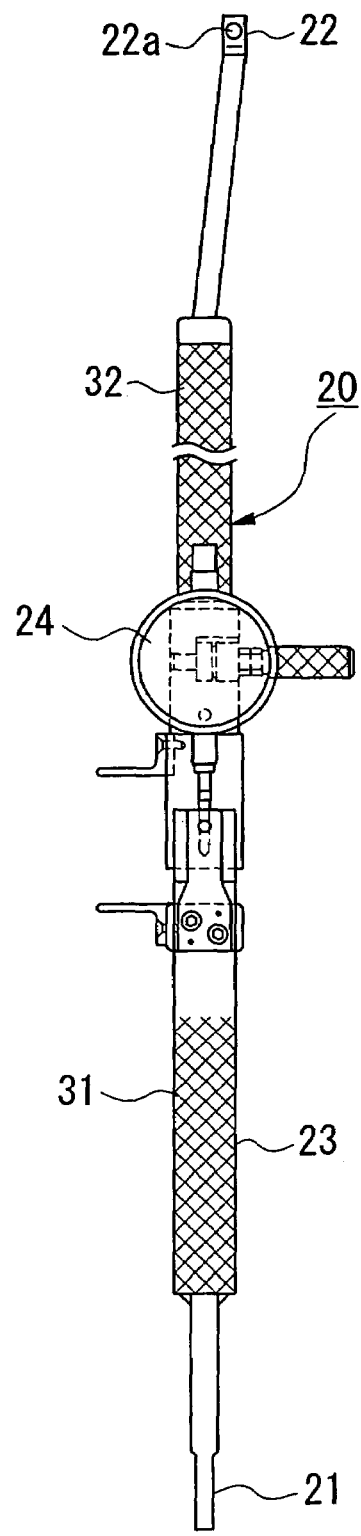
FIG. 2 is a side view of the turbine blade creep elongation strain measuring apparatus in an embodiment of the present invention which is viewed in the direction indicated by arrow A—A in FIG. 1.

In FIGS. 1 and 2, reference numeral 20 indicates a turbine blade creep elongation strain measuring apparatus which measures the creep elongation strain of the turbine blade 10. The turbine blade creep elongation strain measuring apparatus 20 comprises a first fixed end 21 which is attached to the inner shroud 10a (one end) of the turbine blade 10, a second fixed end 22 which is attached to the outer shroud 10b (the other end), a connecting section 23 which connects the first fixed end 21 and the second fixed end 22 and applies a force in a direction such that the first fixed end 21 and the second fixed end 22 are moved closer, and a dial gauge 24 (measuring apparatus) which measures the interval dimension L between the first fixed end 21 and the second fixed end 22.

The first fixed end 21 is a metal member having a nearly "L"-shape when viewed from the side and has a contacting surface which fits the shape of the downstream end section of the inner shroud 10a.

The second fixed end 22 is a metal member having a nearly "L"-shape when viewed from the side and has a contacting surface which fits the shape of the downstream end section of the outer shroud 10b. Reference numeral 22a is an adjusting bolt which adjusts an axis line 20a of the turbine blade creep elongation strain measuring apparatus 20 with respect to the position of the second fixed end 22 in the horizontal direction. By adjusting the position of the adjusting bolt 22a when necessary, it is possible to adjust the axis line 20a of the turbine blade creep elongation strain measuring apparatus 20 such that the center line CL of the turbine blade 10 is parallel with the axis line 20a of the turbine blade creep elongation strain measuring apparatus 20. Therefore, it is possible to handle various shapes of the turbine blade 10.

The connecting section 23 comprises a first rod 31 having the first fixed end 21 which is fixed to one end of the turbine blade, and a second rod 32 which is connected to the other end of the first rod 31 on the same axis and has the second fixed end 22 which is fixed to the other end of the turbine blade.

Figure 3:
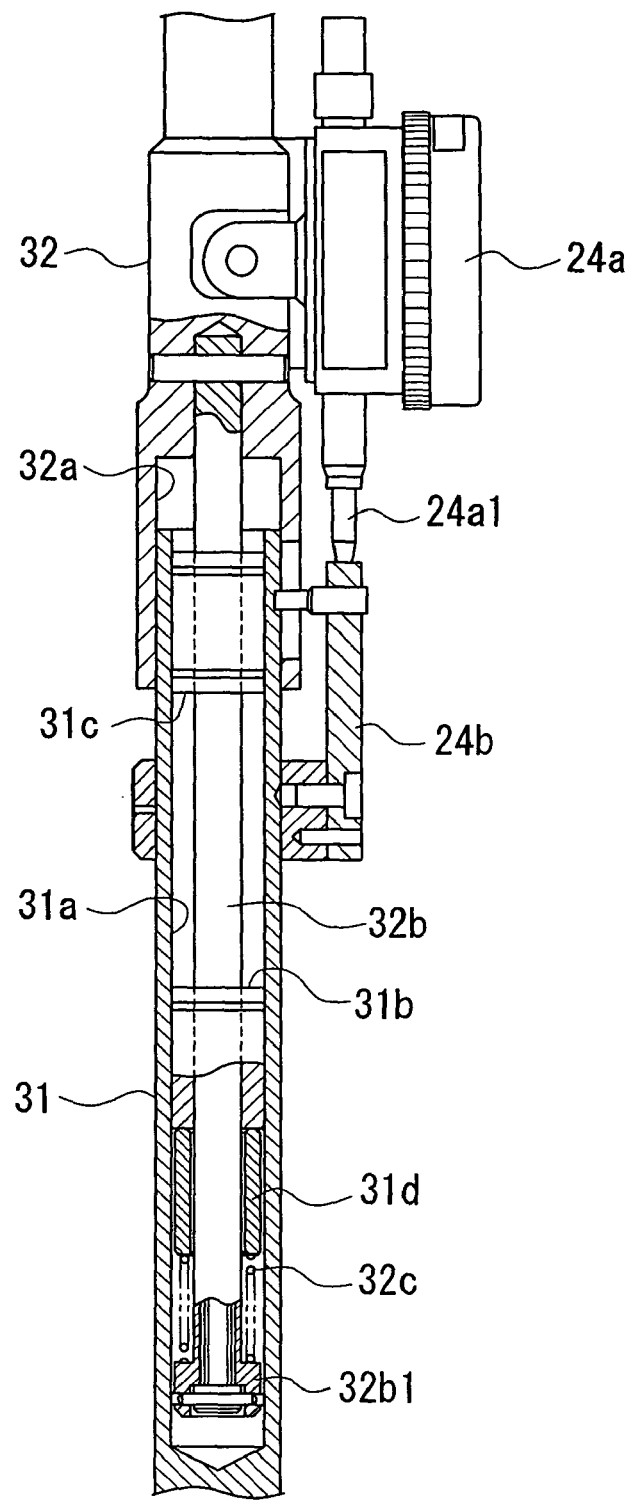
FIG. 3 is a magnified view of a portion of the turbine blade creep elongation strain measuring apparatus.

As shown in FIG. 3, in the connection part of the first rod 31 corresponding to the second rod 32, a deep concave section 31a is formed in the direction of the axial line 20a. In the concave section 31a, a pair of linear bushes 31b and 31c, and a collar 31d are contained. The linear bushes 31b and 31c are cylindrical members and fixed in the concave section 31a at a predetermined interval from each other. The collar 31d is also a cylindrical member which is disposed under the linear bush 31b.

In the connection part of the second rod 32 corresponding to the first rod 31, a deep concave section 32a is formed in the direction of the axis line 20a. In the concave section 32a, the connecting part of the first rod 31 is fit at the same axis so as to slide; thus, the overall length of the connecting section 23 is extendable.

Furthermore, at the connecting part of the second rod 32, the shaft 32b which is inserted into the concave section 31a is fixed. The shaft 32b is inserted through linear bushes 31b and 31c and the collar 31d so as to guide the sliding movement of the second rod 32 toward the first rod 31 in the direction of the axis line 20a.

The tip of the shaft 32b is inserted into a compressing spring 32c as a force applying member. An end of the compressing spring 32c contacts the bottom end of the collar 31d. The other end of the compressing spring 32c contacts a spring stopper 32b1 which is formed in an end of the shaft 32b. Therefore, the first rod 31 and the second rod 32 are forced to be closer by the compressing spring 32c.

As shown in FIG. 3, the dial gauge 24 comprises a dial gauge unit 24a which is fixed on the second rod 32 and a contact section 24b which is fixed on the first rod 31, and has a needle 24a1 of the dial gauge unit 24a which contacts the contact section 24b.

The dial gauge unit 24a can measure the interval dimension L between the first fixed end 21 and the second fixed end 22 accurately by extension of the needle 24a1 caused by contact with the contact section 24b when the interval between the first rod 31 and the second rod 32 increases and decreases. For the dial gauge unit 24a, not only a gauge which determines the interval dimension L as an absolute value but also a gauge which measures a variance of the dimension (difference) with respect to a predetermined reference dimension (for example, the interval dimension L in an initial state) can be employed.

A turbine blade life evaluating method using the turbine blade creep elongation strain measuring apparatus 20 having the above-mentioned structure is explained as follows. First, in the turbine blade 10 in an initial state, the first fixed end 21 is engaged with the inner shroud 10a, and while the interval between the first rod 31 and the second rod 32 is extended while opposing a force which is applied by the compressing spring 32, the second fixed end 22 is engaged with the outer shroud 10b. Consequently, the compressing spring 32c automatically adjusts the interval between the first fixed end 21 and the second fixed end 22 so as to be a minimum. Accordingly, the dial gauge unit 24a accurately indicates the interval dimension L automatically. The measurement operation in an initial state needs to be performed only once, and the measurement results should preferably be stamped on the surface of the turbine blade 10 as mentioned above.

When performing an evaluation of the life of a post-operation turbine blade 10 after a predetermined period of time, a measurement may be performed by the same method as mentioned above. By obtaining the difference from the measurement results under conditions of an initial state, it is possible to determine a post-operation creep elongation strain after a predetermined period of time.

When evaluating such a creep elongation strain, it is preferable to adopt a method wherein a turbine blade is determined to be within its allowable life if the creep elongation strain in a longitudinal direction of the turbine blade is less than 0.5% of the initial length, and the turbine blade is determined to have exceeded its allowable life if the creep elongation strain in the longitudinal direction of the turbine blade is 0.5% or more than the initial length.

In an ordinary turbine blade, the turbine blade rapidly decreases in strength and fractures when the creep elongation strain exceeds 2%. Therefore, by adopting a creep elongation strain such as 0.5% which is lower than 2% as a reference for evaluating the allowable life, it is possible to determine the life of the turbine blade such that a creep defect of the turbine blade 10 will not occur.

Also, by performing such a measurement operation for each operation period, it is possible to determine the changing behavior of the creep elongation strain over time. Thus, according to such changing behavior, it is possible to estimate how many hours remain until the end of the life.

According to the turbine blade life evaluating method using such a turbine blade creep elongation strain measuring apparatus 20, it is possible to evaluate life of the turbine blade 10 quantitively. Therefore, it is possible to prevent a problem in that a creep defect suddenly occurs in a turbine blade which causes serious damage to the entire gas turbine.

Also, by stamping the measurement result under an initial condition on the surface of the turbine blade 10 according to the present invention, in a subjected measurement, it is possible to know the life of a turbine blade without taking the time to refer to records such as blueprints. Therefore, it is possible to reduce the time for measuring the creep elongation strain for the purpose of performing a life evaluation of the turbine blade 10. Additionally, because the measurement results which are desired to be known are stamped on the surface of the turbine blade, it is possible to prevent mistakes from happening in advance due to an oversight such as misidentification of a product number.

Figure 4:
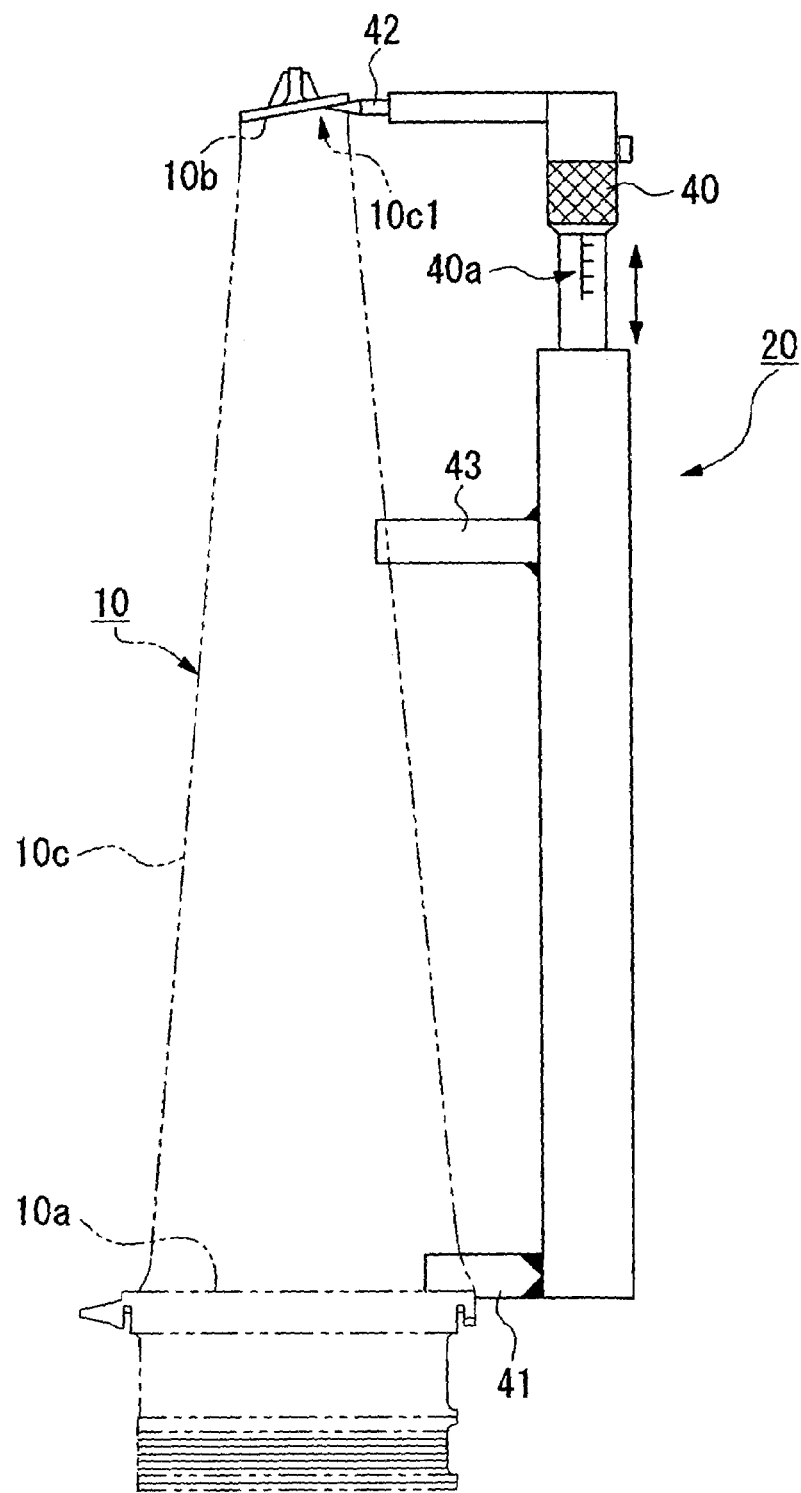
FIG. 4 is a front view of the turbine blade creep elongation strain measuring apparatus in a modified embodiment of the present invention.

A modified embodiment of the turbine blade creep elongation strain measuring apparatus 20 is explained with reference to FIGS. 4 and 5. The modified embodiment as shown in FIG. 4 is different from the above-mentioned embodiment particularly in that the turbine blade creep elongation strain measuring apparatus 20 is fixed on the turbine blade 10 by a different method and a micrometer 40 is provided in place of the dial gauge 24. That is, in the present modified embodiment, the turbine blade creep elongation strain measuring apparatus 20 is supported by a three-point-supporting method using a first fixed end 41 which contacts a flat upper surface of the downstream end of the inner shroud 10a, a second fixed end 42 having a tip which is inserted into a dimple 10c1 which is formed in the downstream edge of the blade section 10c and near the outer shroud 10b, and a third fixed end 43 being positioned between the first fixed end 41 and second fixed end 42 so as to contact the downstream edge of the blade section 10c. In addition, the measurement results by the micrometer 40 can be indicated by a scale mark 40a.

Figure 5:
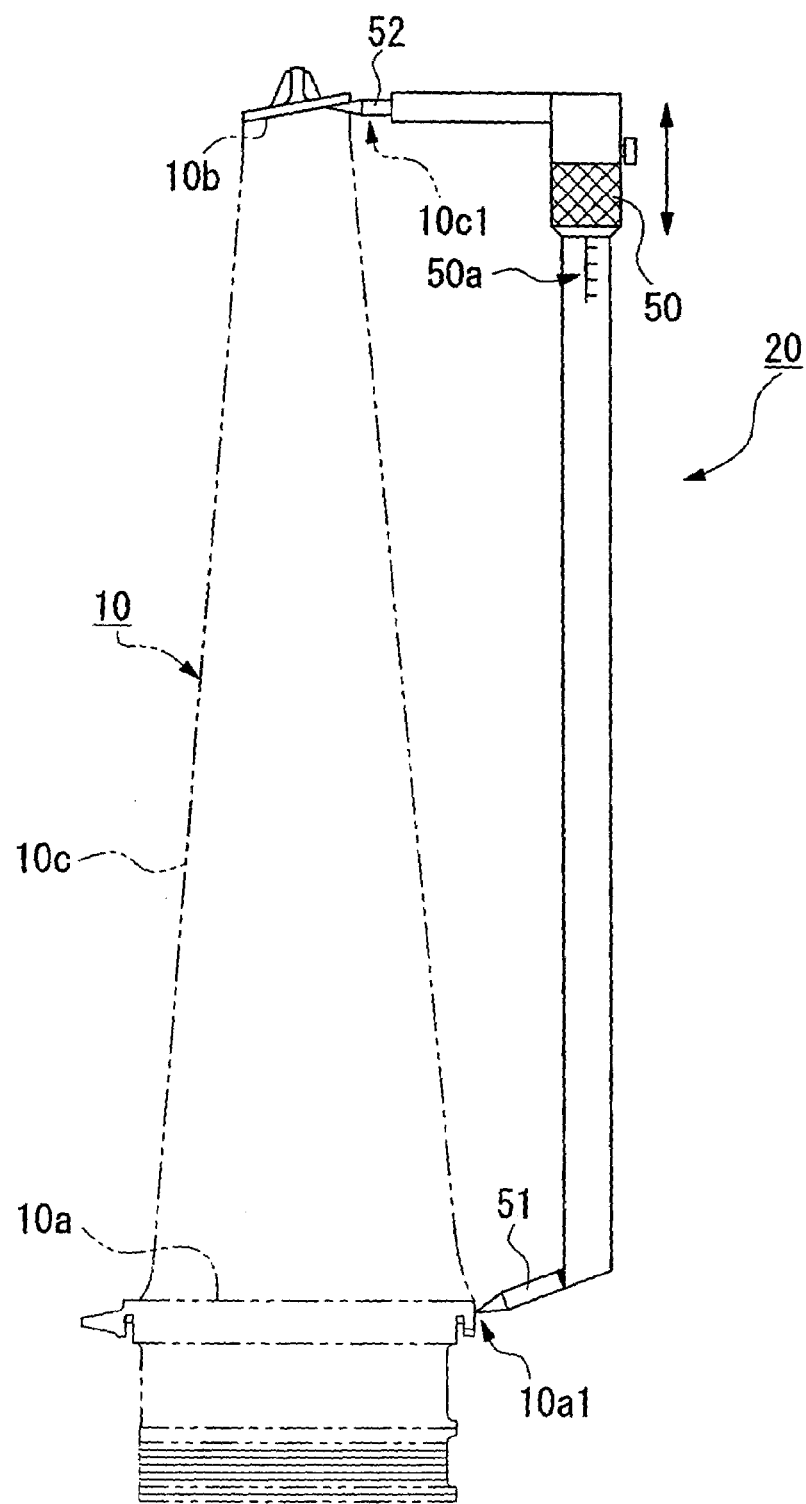
FIG. 5 is a front view of the turbine blade creep elongation strain measuring apparatus in another modified embodiment of the present invention.
Figure 6:
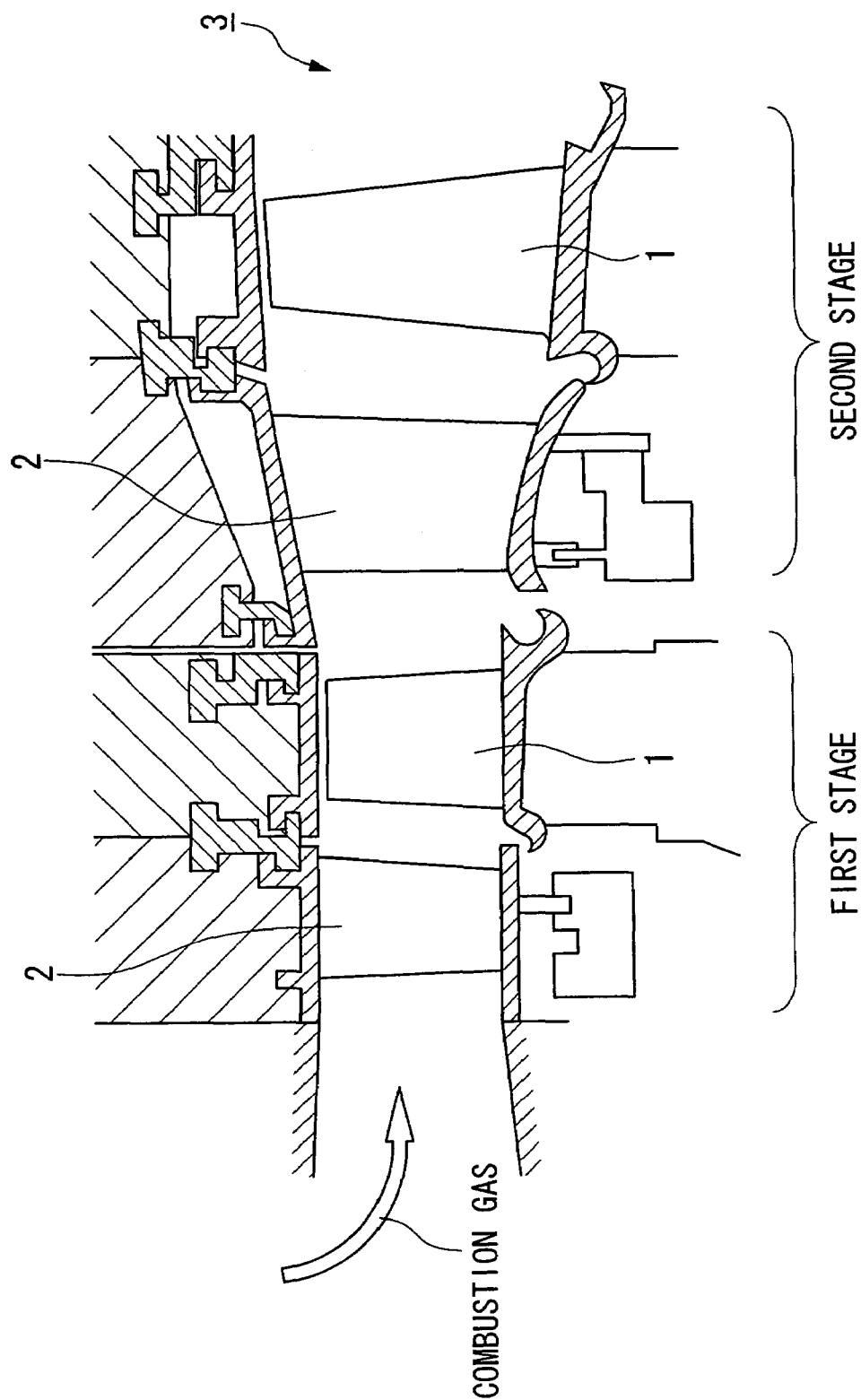
FIG. 6 is a view for explaining an internal structure of a gas turbine.

The modified embodiment of the turbine blade creep elongation strain measuring apparatus 20 as shown in FIG. 5 is different from the above-mentioned embodiment particularly in that the turbine blade creep elongation strain measuring apparatus 20 is fixed on the turbine blade 10 by a different method and a micrometer 50 is provided in place of the dial gauge 24. That is, in the present modified embodiment, the turbine blade creep elongation strain measuring apparatus 20 is supported by a first fixed end 51 having a tip which is inserted into a dimple 10a1 which is formed in the downstream edge of the inner shroud 10a and a second fixed end 52 having a tip which is inserted into the dimple 10c1 which is formed in the downstream edge of the blade section 10c and near the outer shroud 10b. In addition, the measurement results by the micrometer 50 can be indicated by a scale mark 50a.

Here, it is preferable that more precise result can be obtained when a measurement is performed under condition that an influence of thermal expansion in the turbine is taken into account in the above embodiment and modified embodiments.

That is, In a first measurement in which a creep expansion distortion is zero, a temperature in a wall of the turbine blade 10 is recorded (it is preferable that the above longitudinal direction dimension L and the temperature in a wall are marked on the inner shroud 10a on the turbine blade 10.) Consequently, a temperature in a wall and the longitudinal direction dimension L are measured when evaluating a fatigue life of the turbine blade 10. As long as the temperature in a wall is the same as the temperature in the wall in a first measurement, it is not necessary to correct the temperature. When there is a difference between the measured temperature, correction is made in taking the thermal expansion amount into consideration. That is, necessary correction is determined by calculating the thermal expansion amount according to a raw data of the turbine blade 10. In addition, such a thermal expansion amount is deducted from the measurement result of the longitudinal direction dimension L; thus, it is possible to synchronize the wall-temperature condition with that in the first measurement. It is also acceptable if the wall temperature is adjusted each time the measurement is performed according to the temperature obtained in the first measurement. In such a case, it is possible to skip a process for correcting the thermal expansion amount.

What is claimed is:

1. A measuring apparatus, comprising:
   a first rod comprising a first fixed end configured to connect to an inner shroud of a turbine blade and a first opposite end defining a first concave section;
   a second rod comprising a second fixed end configured to connect to an outer shroud of the turbine blade and a second opposite end defining a second concave section and having a shaft, the first opposite end disposed in the second concave section, and the shaft disposed in the first concave section; and
   a measuring device configured to measure a distance between the first and second fixed ends.

2. The measuring apparatus according to claim 1, further comprising:
   a biasing member disposed between the first and second rods and configured to bias the first and second fixed ends toward one another.

3. The measuring apparatus according to claim 2, wherein the biasing member comprises a spring.

4. The measuring apparatus according to claim 3, wherein the spring is disposed in the first concave section.

5. The measuring apparatus according to claim 1, wherein the measuring device comprises a dial gauge.

6. The measuring apparatus according to claim 5, further comprising:
   a contact section disposed on one of the first and second rods, the contact section configured to contact a needle of the dial gauge;
   wherein the dial gauge is disposed on another one of the second and first rods.

7. The measuring apparatus according to claim 6, wherein the contact section is disposed on the first rod, and the dial gauge is disposed on the second rod.

8. The measuring apparatus according to claim 1, further comprising:
   at least one bushing disposed in the first concave section and configured to guide motion of the shaft.

9. The measuring apparatus according to claim 8, further comprising:
   a resilient member disposed between the at least one bushing and an end portion of the shaft, the resilient member configured to bias the first and second fixed ends toward one another.

10. The measuring apparatus according to claim 9, further comprising:
    a sleeve disposed between the resilient member and the at least one bushing.

11. The measuring apparatus according to claim 10, wherein the at least one bushing comprises at least two bushings.

12. The measuring apparatus according to claim 11, wherein the resilient member comprises a compression spring.

13. The measuring apparatus according to claim 12, wherein the end portion of the shaft comprises a stopper having a diameter greater than a diameter of an adjacent portion of the shaft, such that the compression spring surrounds the adjacent portion of the shaft and contacts the stopper.

14. The measuring apparatus according to claim 1, wherein at least one of the first and second rods comprises an about L-shape.

15. A measuring apparatus, comprising:
    a first rod comprising a first fixed end configured to connect to a first portion of a turbine blade and a first free end opposite the first fixed end, a first void being formed in the first free end;
    a second rod comprising a second fixed end configured to connect to a second portion of the turbine blade and a second free end opposite the second fixed end, a second void being formed in the second free end, and the second free end including a shaft, the shaft disposed in the first void, and the first free end disposed in the second void;
    a biasing member configured to urge the first and second fixed ends relative to one another; and
    a measuring device configured to measure a distance between the first and second fixed ends.

16. The measuring apparatus according to claim 15, wherein the biasing member surrounds a portion of the shaft and is disposed between an end of the shaft and a portion of the first rod.

17. The measuring apparatus according to claim 16, wherein a bushing is fixed to the first rod, and the biasing member is disposed between the end of the shaft and the bushing.

18. The measuring apparatus according to claim 17, wherein the biasing member comprises a spring.

19. The measuring apparatus according to claim 17, wherein the biasing member comprises a compression spring.

* * * * *